US009010690B1

(12) United States Patent
Al-Heraibi (10) Patent No.: US 9,010,690 B1
(45) Date of Patent: Apr. 21, 2015

(54) AIRBORNE RECOVERY SYSTEM FOR AIRCRAFT WITH DISABLED LANDING GEAR

(71) Applicant: Abdulrahman S. J. M. Al-Heraibi, Rabiya (KW)

(72) Inventor: Abdulrahman S. J. M. Al-Heraibi, Rabiya (KW)

( * ) Notice: Subject to any disclaimer, the term of this patent is extended or adjusted under 35 U.S.C. 154(b) by 0 days.

(21) Appl. No.: 14/340,522

(22) Filed: Jul. 24, 2014

(51) Int. Cl.
*B64D 17/00* (2006.01)

(52) U.S. Cl.
CPC .................................... *B64D 17/00* (2013.01)

(58) Field of Classification Search
USPC ............ 244/139, 100 R, 110 E, 138 R, 2, 1 R
See application file for complete search history.

(56) References Cited

U.S. PATENT DOCUMENTS

| 2,436,240 | A | | 2/1948 | Wiertz | |
|---|---|---|---|---|---|
| 3,003,717 | A | * | 10/1961 | Booker | 244/2 |
| 3,128,066 | A | * | 4/1964 | Bailey | 244/114 R |
| 3,389,880 | A | * | 6/1968 | Ferguson | 244/137.1 |
| 4,462,560 | A | * | 7/1984 | Earl | 244/63 |
| 4,917,329 | A | | 4/1990 | Vollmerhausen | |
| 5,000,398 | A | * | 3/1991 | Rashev | 244/2 |
| 6,293,487 | B1 | * | 9/2001 | Gaite | 244/3 |
| 6,394,391 | B1 | * | 5/2002 | Lo | 244/110 E |
| 6,951,322 | B2 | * | 10/2005 | Klima | 244/138 R |
| 7,568,658 | B2 | * | 8/2009 | Li | 244/110 E |
| 7,793,888 | B2 | | 9/2010 | Padan | |
| 8,070,096 | B2 | * | 12/2011 | Wood et al. | 244/116 |
| 8,100,365 | B2 | * | 1/2012 | Fleming, III | 244/139 |
| 8,733,805 | B2 | * | 5/2014 | Nazzari | 292/317 |
| 2010/0102167 | A1 | * | 4/2010 | Dital | 244/110 E |

FOREIGN PATENT DOCUMENTS

GB 926613 5/1963

* cited by examiner

*Primary Examiner* — Christopher P Ellis
(74) *Attorney, Agent, or Firm* — Richard C. Litman (57) ABSTRACT

The airborne recovery system for aircraft with disabled landing gear includes a cradle holder removably secured to a rescue aircraft and a wheeled cradle removably secured atop the cradle holder. The rescue aircraft carries the cradle holder and cradle the rescue aircraft. The cradle holder is extended above the rescue aircraft for clearance as the rescue aircraft approaches the disabled aircraft. The forward portion of the cradle is also extended to support the forward fuselage of the disabled aircraft. The disabled aircraft is flown to mate with the cradle, and the cradle is separated from its cradle holder on the rescue aircraft. The disabled aircraft is then flown to a landing, supported by the wheels of the underlying cradle. The landing gear of the disabled aircraft is then lowered and repaired, and the cradle is removed for reinstallation upon the cradle holder of the rescue aircraft.

18 Claims, 8 Drawing Sheets

AIRBORNE RECOVERY SYSTEM FOR AIRCRAFT WITH DISABLED LANDING GEAR

BACKGROUND OF THE INVENTION

1. Field of the Invention

The present invention relates generally to aviation safety systems, and particularly to an airborne recovery system for aircraft with disabled landing gear.

2. Description of the Related Art

Relatively high speed aircraft generally incorporate retractable landing gear in order to reduce aerodynamic drag and to increase efficiency and fuel economy in flight. While this is primarily true of airplanes, i.e., fixed wing powered aircraft, it is also true of higher performance helicopters, and even many types of gliders or sailplanes insofar as increasing aerodynamic efficiency is concerned.

The designers and manufacturers of aircraft with such retractable landing gear systems endeavor to design and construct such systems to have the highest practical reliability. Nevertheless, the occasional landing gear system failure can and will occur with such aircraft. This may be due to any of a number of causes, such as depletion of hydraulic fluid due to a leak, a mechanical component becoming disconnected or jammed by foreign matter, etc. In such instances, the flight crew of the aircraft has no alternative but to land the aircraft with the landing gear retracted, assuming that it has not locked or jammed at some intermediate position. Such potential occurrences have been planned for at all certified air carrier airports, so that firefighting vehicles are on hand capable of deploying foam on a runway to reduce the chance of fire during or after the wheels-up landing.

Nevertheless, landing a retractable gear aircraft with the landing wheels retracted is still a risky operation. The larger and heavier the aircraft and the number of passengers being carried and the greater the landing speed, the greater chance there is of significant damage to the aircraft and/or injury to passengers. Even in the event of a successful wheels-up landing by a large air carrier aircraft, there will be significant damage to the aircraft structure due to the significantly greater forces and speeds encountered during such a landing. Such damage may well result in repair costs greater than the value of the aircraft, even when the obvious external damage to aircraft skin panels does not initially appear to be great.

Thus, an airborne recovery system for aircraft with disabled landing gear solving the aforementioned problems is desired.

SUMMARY OF THE INVENTION

The airborne recovery system for aircraft with disabled landing gear comprises a telescoping platform or cradle holder that is removably secured to a rescue aircraft to extend thereabove, and a cradle that is removably secured to the cradle holder for temporary attachment beneath a disabled aircraft. The cradle has landing wheels extending below it to allow the aircraft with disabled landing gear to be landed safely. Once the landing has been accomplished the disabled aircraft is lifted by conventional means, e.g., hydraulic jacks using the conventional jack points provided on such aircraft, and the cradle is removed and reinstalled atop its cradle holder for reuse when needed.

The cradle holder is supported above the rescue aircraft by a plurality of telescoping legs, which are normally retracted for most of the rescue mission. As the rescue aircraft nears the aircraft with the disabled landing gear, the cradle holder is raised above the top of the vertical fin and rudder of the rescue aircraft to provide clearance from those structures while the disabled aircraft is flown to mate with the cradle. The forward portion of the cradle holder is also extended forward to support the forward portion of the fuselage of the disabled aircraft. Once the cradle has been securely attached beneath the disabled aircraft, it is detached from the cradle holder. The disabled aircraft with the wheeled cradle attached below it is then flown to a landing site. The disabled aircraft is supported by the wheeled cradle once it is on the surface. The landing gear of the disabled aircraft is repaired and lowered, and the cradle is removed from the disabled aircraft and reinstalled upon its cradle holder on the rescue aircraft for further service, as noted further above.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
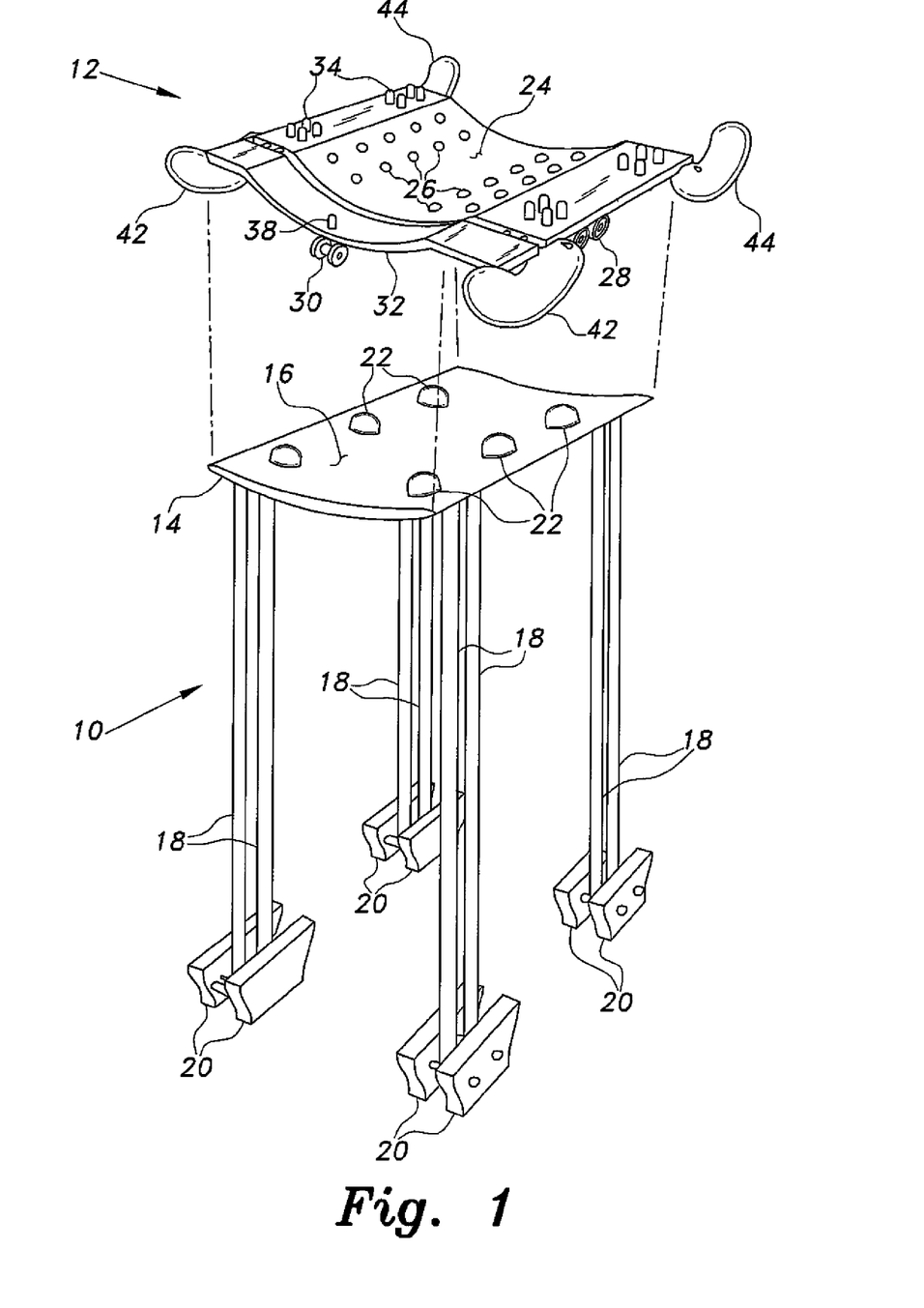
FIG. 1 is an exploded perspective view of the telescoping cradle holder and emergency landing gear cradle of the airborne recovery system for aircraft with disabled landing gear according to the present invention.

The airborne recovery system for aircraft with disabled landing gear enables the disabled aircraft to be rescued or recovered by a rescue aircraft equipped with the apparatus of the system. FIG. 1 of the drawings provides an exploded perspective view of the two primary components of the system, i.e., a cradle support 10 that attaches above a rescue aircraft and a wheeled emergency landing gear cradle 12 that is removably attached atop the cradle support 10 for temporary attachment and support of an aircraft with disabled landing gear.

The cradle support 10 comprises a curved plate 14 having an upper surface 16 to provide a nesting surface for the overlying cradle 12 when installed thereon. The cradle support 10 is supported above the rescue aircraft upon which it is installed by a plurality of selectively telescoping legs 18, which have rescue aircraft attachment fittings 20 disposed upon their distal ends. The telescoping legs 18 may be conventional telescoping units, using hydraulic or other pressure or force for extension. A plurality of rollers 22 are installed in the bed of the cradle support 10 so that the upper portions of the rollers 22 protrude above the upper surface 16 of the cradle support 10. The rollers 22 reduce friction and provide for adjustment in the positioning of the cradle 12 atop the cradle support 10.

The emergency landing gear cradle 12 comprises a curved plate configured to fit closely with the curvature of the underlying cradle support 10 when installed thereon, and to the curvature of the lower fuselage of an aircraft with retracted landing gear, as when the landing gear is disabled for some reason. The concave curve of the upper surface 24 of the cradle 12 is configured to allow the lower fuselage of an aircraft with disabled landing gear to alight and nest atop the cradle 12. A plurality of rollers 26 is provided in the cradle 12 to protrude above the upper surface 24 thereof to reduce friction and facilitate alignment of the aircraft with disabled landing gear during the recovery operation. The cradle 12 is provided with left and right main emergency landing gear assemblies (wheels) 28 extending below the cradle 12. The left assembly is visible in FIG. 1 of the drawings. A nose emergency landing gear assembly 30 also extends downward from a cradle extension 32 that telescopes forward and rearward. The cradle 12 remains temporarily attached to the bottom of the disabled aircraft during the recovery operation, and the main and nose emergency landing gear assemblies 28 and 30 serve to support the disabled aircraft through the landing procedure.

Figure 2:
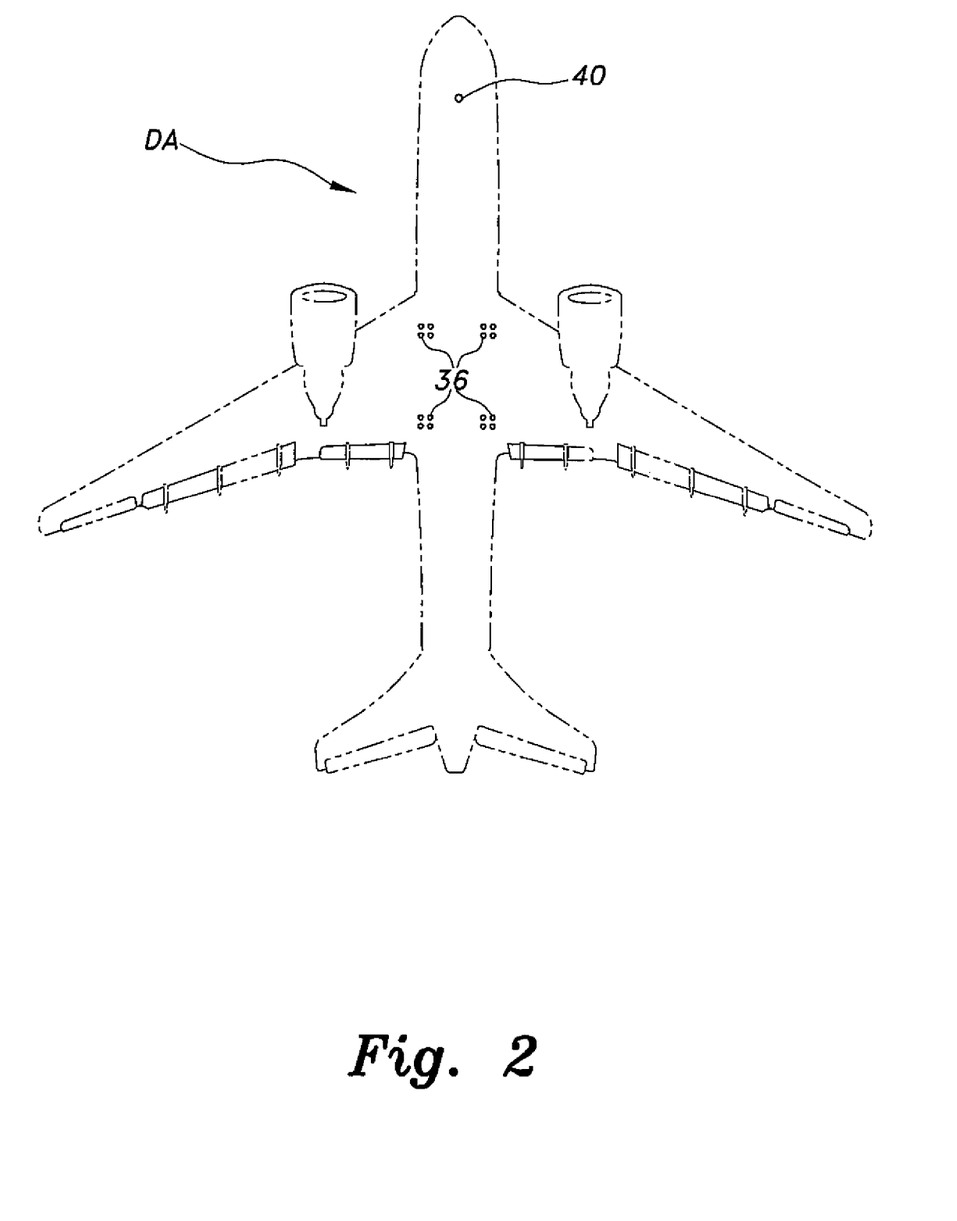
FIG. 2 is a bottom plan view of an aircraft with disable landing gear, showing the cradle engagement receptacles mounted in the aircraft in the airborne recovery system for aircraft with disabled landing gear according to the present invention.

A plurality of temporary attachment fasteners or pins 34 extend upward from lateral extensions of the upper surface 24 of the cradle 12. The pins 34 mate with corresponding sockets or receptacles 36 provided in the bottom of the disabled aircraft DA, shown in FIG. 2 of the drawings. One or more additional pin(s) 38 extend(s) upward from the telescoping extension 32 of the cradle 12. The forwardly disposed pin(s) 38 engage a corresponding receptacle(s) 40 in the lower forward fuselage of the disabled aircraft A, shown in FIG. 2. The receptacles 36 and 40 of the disabled aircraft DA are equipped with conventional locking mechanisms to positively secure the pins 34 and 38 in the corresponding receptacles 36 and 40.

The emergency landing gear cradle 12 includes additional devices to positively secure the cradle 12 and the disabled aircraft DA to one another. Laterally disposed first and second leading edge wing restraints 42 extend adjustably from opposite sides of the cradle 12 to fit closely about the leading edge of the wing of the disabled aircraft DA secured to the cradle 12, as shown in other drawings and described in further detail below. Similarly, Laterally disposed first and second trailing edge wing restraints 44 extend adjustably from opposite sides of the cradle 12 to secure the wings of the disabled aircraft DA between the wing restraints 42 and 44.

Figure 3:
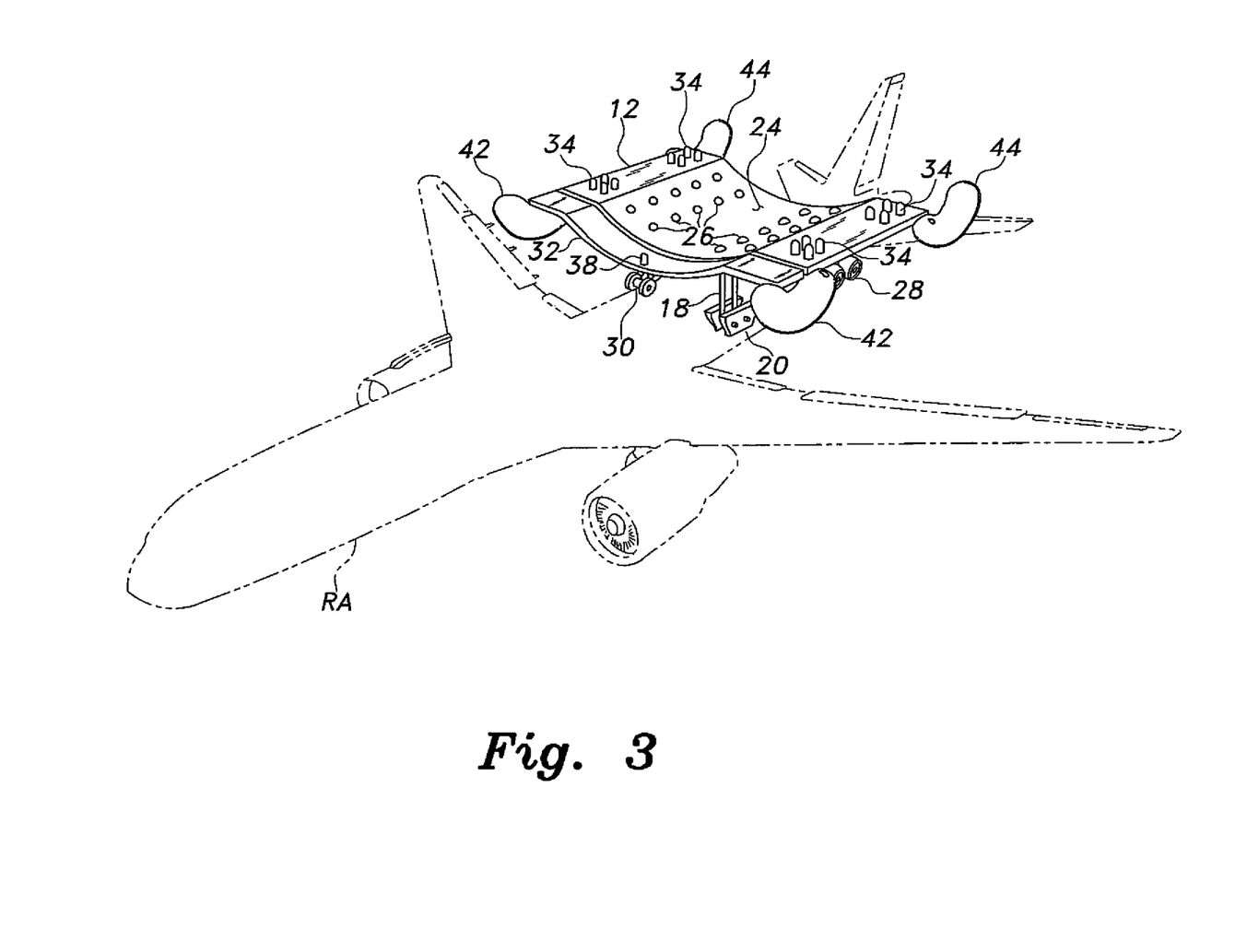
FIG. 3 is a perspective view of the cradle holder and emergency landing gear cradle of the airborne recovery system for aircraft with disabled landing gear according to the present invention, showing the cradle holder and cradle in their retracted states as installed upon a rescue aircraft.

FIGS. 3 through 8 provide sequential illustrations showing the basic steps in the recovery or rescue of an aircraft with disabled landing gear DA using the apparatus or system described above. In FIG. 3, the cradle support apparatus 10 is shown in its retracted state aboard a recovery or rescue aircraft. This is the point in the scenario after an aircraft with disabled landing gear has notified the authorities of its condition, and the rescue aircraft having a cradle support apparatus 10 and emergency landing gear cradle 12 has been dispatched to meet with the disabled aircraft. The cradle support apparatus 10 is not shown in FIG. 3 due to the emergency landing gear cradle 12 temporarily installed thereon.

Figure 4:
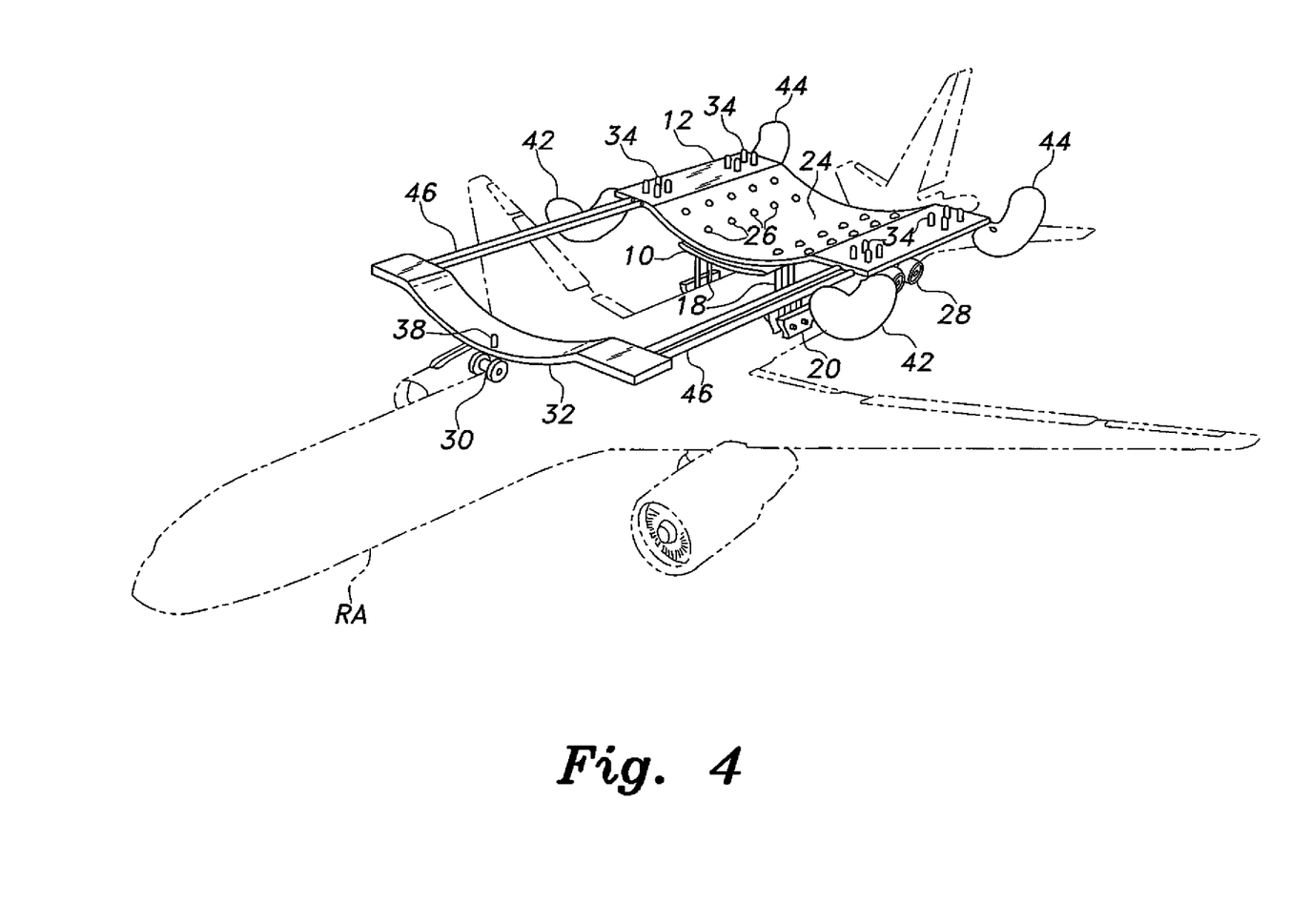
FIG. 4 is a perspective view of the cradle holder and emergency landing gear cradle of the airborne recovery system for aircraft with disabled landing gear according to the present invention, showing the cradle holder in its retracted state and the cradle with its forward portion extended as installed upon a rescue aircraft.

FIG. 4 shows the deployment of the forward cradle extension 32 on forward-extending and telescoping arms 46. In a tricycle landing gear aircraft, i.e., having left and right main landing gear assemblies and a nose wheel assembly, the main landing gear is rearward of the center of gravity of the aircraft. The emergency landing gear cradle 12 is positioned beneath the disabled aircraft DA at about the position of its main landing gear. Thus, an additional wheel support is required for the forward extended nose of the disabled aircraft DA. In order to avoid the considerable mass of a continuous cradle extending from the nose wheel back to the main wheels, the forward portion of the cradle 12 has a cradle extension 32 that may be selectively telescoped therefrom. This positions the nose wheel emergency landing gear assembly 30 at about the proper location beneath the forward portion of the disabled aircraft DA. The cradle extension 32 selectively extends and retracts on telescoping longitudinal arms or struts 46. The extension 32 is typically deployed in flight on the recovery or rescue aircraft RA shortly before its intercept with the disabled aircraft DA.

Figure 5:
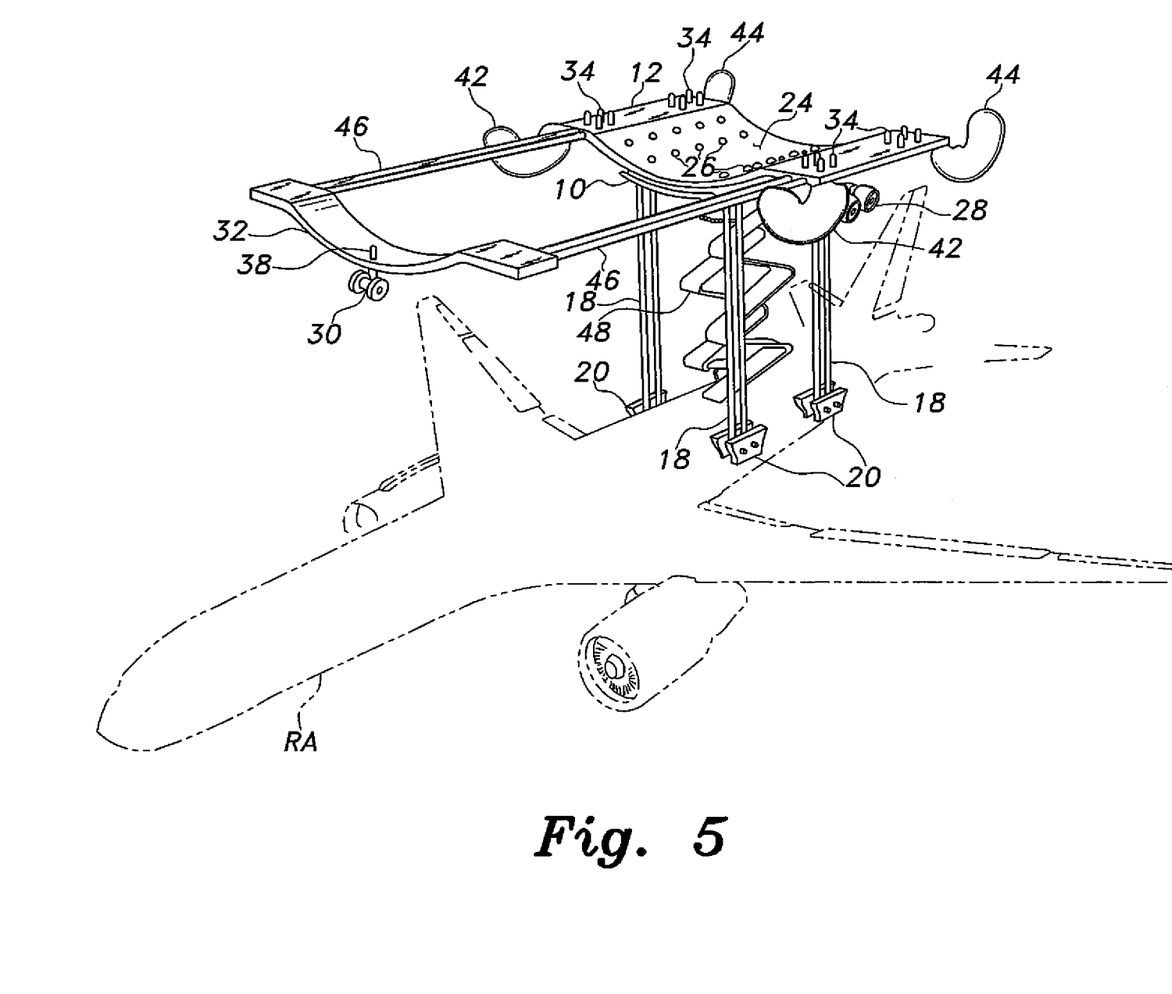
FIG. 5 is a perspective view of the cradle holder and emergency landing gear cradle of the airborne recovery system for aircraft with disabled landing gear according to the present invention, showing the cradle holder and cradle in their extended states as installed upon a rescue aircraft.

In FIG. 5, the emergency landing gear cradle 12 is shown extended to its highest position relative to the rescue aircraft RA. This provides sufficient clearance above the recovery aircraft RA to avoid contact between the vertical tail surfaces of the recovery aircraft RA and the disabled aircraft DA, as well as reducing aerodynamic interference between the two aircraft. The motive force providing for the extension of the cradle 12 may be provided by the telescoping cradle support legs or struts 18, as described further above, or alternatively, by a pantograph linkage or mechanism 48 extending from beneath the cradle support 10 and extending downward between the support legs 18 to secure to the top of the recovery aircraft RA. The pantograph linkage 48 has been omitted in FIG. 1 for clarity in the drawing. Operative power for the extension of the cradle support 10 and emergency landing gear cradle 12 thereon, as well as for deployment of the cradle extension 32 and other systems, may be provided by an onboard power supply in the recovery aircraft RA.

Figure 6:
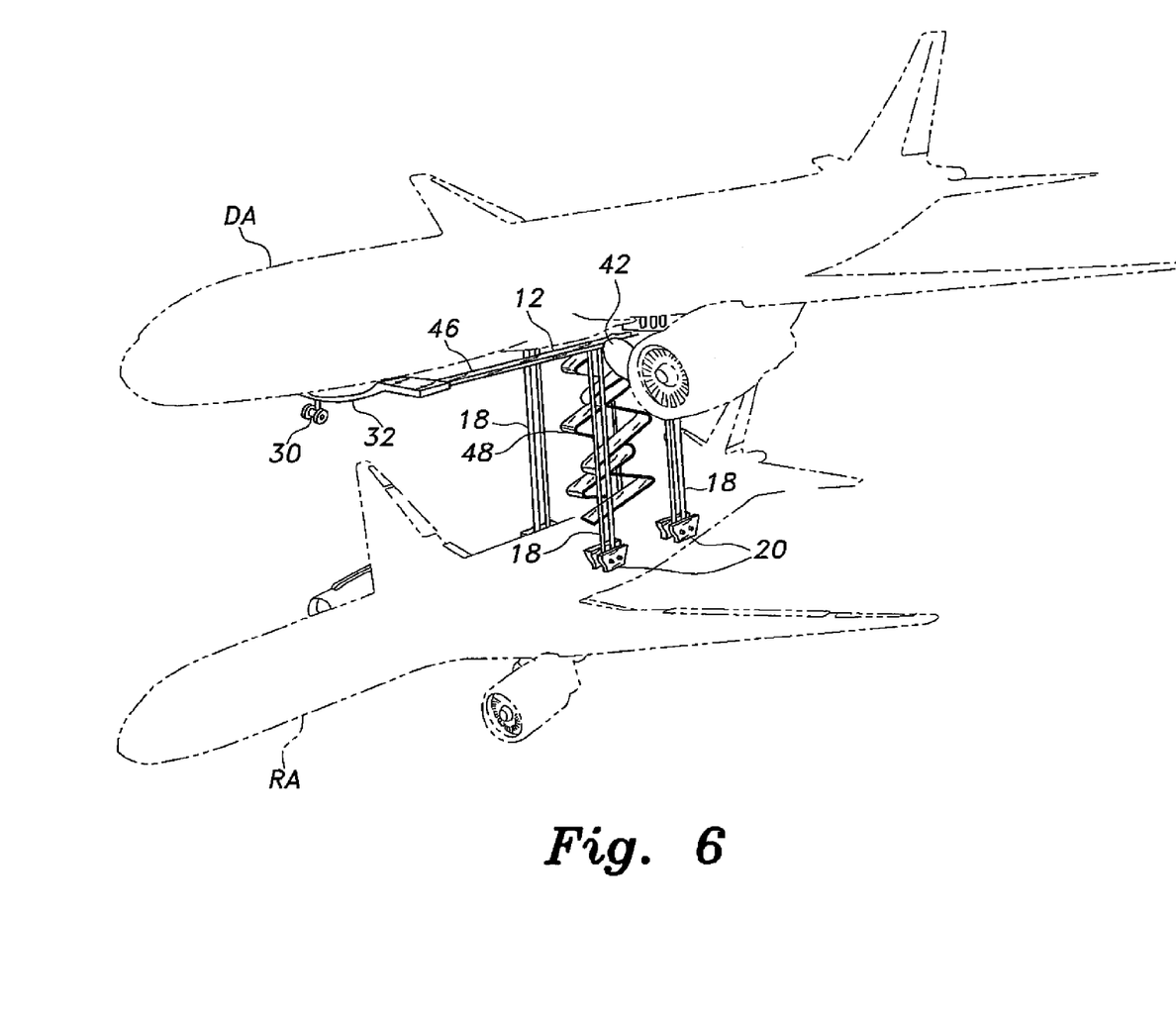
FIG. 6 is a perspective view of the cradle holder and emergency landing gear cradle of the airborne recovery system for aircraft with disabled landing gear according to the present invention, showing the cradle holder and cradle in their extended states as installed upon a rescue aircraft and a disabled aircraft resting upon the cradle.
Figure 7:
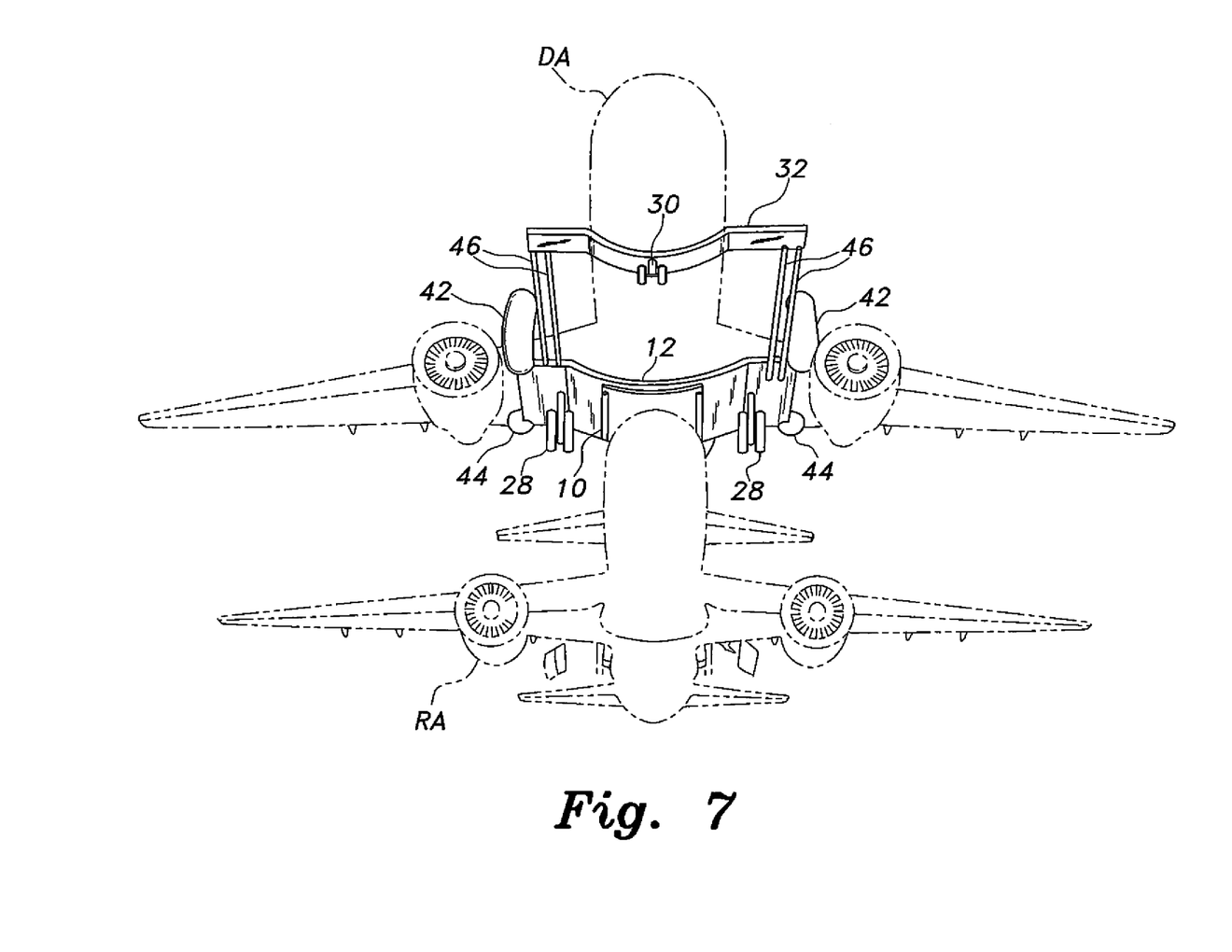
FIG. 7 is a bottom perspective view of the cradle holder and emergency landing gear cradle of the airborne recovery system for aircraft with disabled landing gear according to the present invention, showing the cradle holder and cradle in their extended states as installed upon a rescue aircraft and a disabled aircraft resting upon the cradle.

FIGS. 6 and 7 show the disabled aircraft DA in position atop the emergency landing gear cradle 12, and also show the cradle 12 and the forward extension 32 extended or deployed, similar to the extension shown in FIG. 5. The disabled aircraft DA is positively secured to the cradle 12 at this point by means of the conventional locking apparatus noted further above for latching the pins 34 and 38 within the corresponding receptacles 36 and 40 of the disabled aircraft DA.

Figure 8:
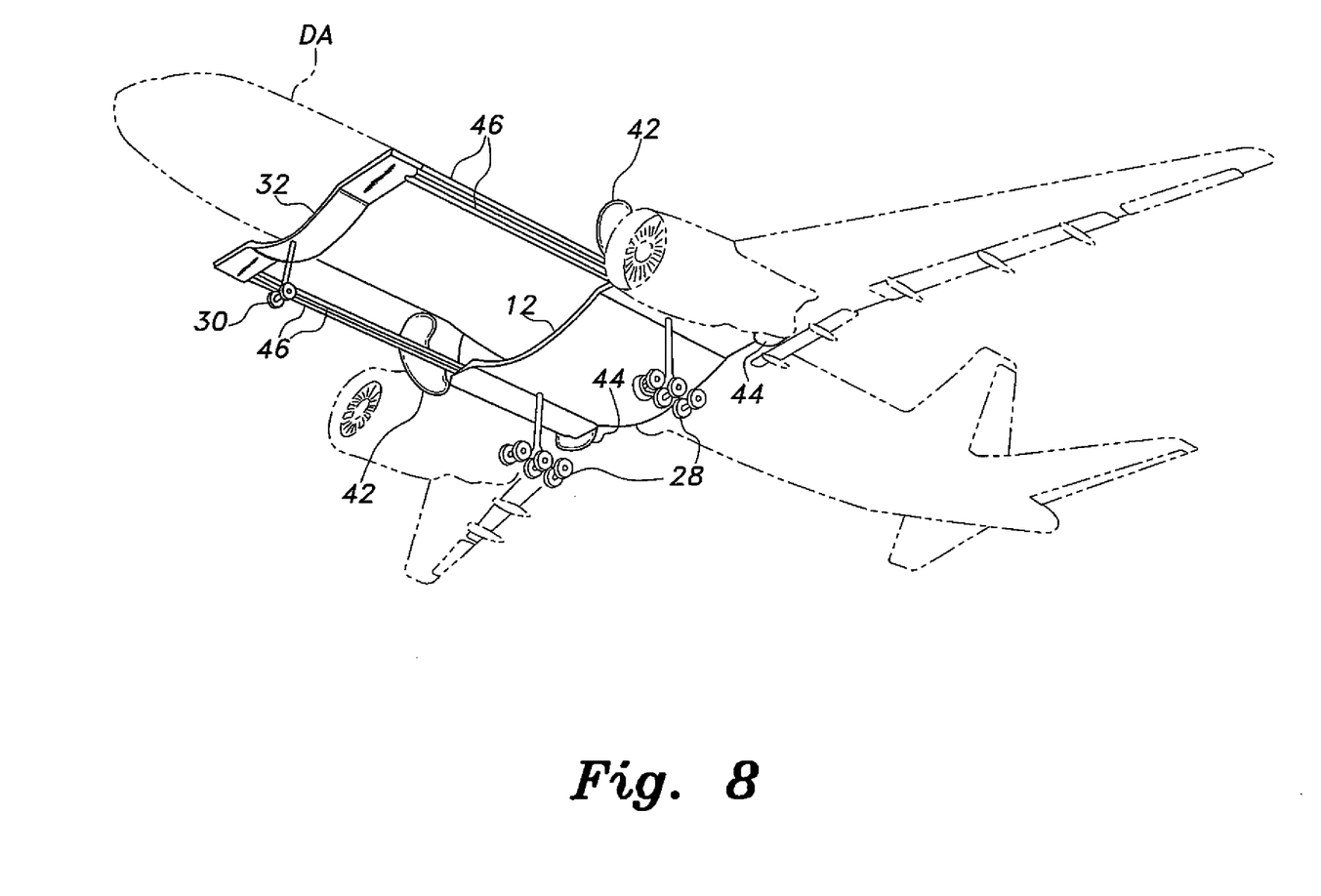
FIG. 8 is a bottom perspective view of the emergency landing gear cradle after separation from the cradle holder and rescue aircraft, shown attached beneath a disabled aircraft.

Finally, FIG. 8 illustrates the disabled aircraft DA having the emergency landing gear cradle 12 secured thereto after separation from the cradle support 10 of the rescue or recovery aircraft RA. It will be noted that the leading and trailing edge wing restraints 42 and 44 of the cradle 12 have been raised to capture the wing of the disabled aircraft DA therebetween. This would be accomplished before release of the cradle 12 from the cradle support 10, at about the same point that the pins 34 and 38 of the cradle 12 are positively latched to the disabled aircraft DA. At this point, the flight crew of the disabled aircraft DA may proceed to the nearest suitable airport to land the disabled aircraft DA upon the main and nose wheel assemblies 28 and 30 extending beneath the emergency landing gear cradle 12. After landing, the disabled aircraft DA is moved to a suitable maintenance and repair facility, where it may be lifted for removal of the emergency landing gear cradle 12. When this has been accomplished, the landing gear of the disabled aircraft DA may be repaired as necessary, and the emergency landing gear cradle 12 may be returned to the recovery aircraft RA for reinstallation atop the cradle support 10.

It is to be understood that the present invention is not limited to the embodiments described above, but encompasses any and all embodiments within the scope of the following claims.

I claim:

1. An airborne recovery system for aircraft with disabled landing gear, comprising:
    an emergency landing gear cradle having an upper surface adapted for temporary attachment to an aircraft with disabled landing gear;
    a plurality of temporary attachment fasteners extending upward from the cradle;
    a plurality of emergency landing wheels extending downward from the cradle;
    a cradle support, the cradle being disposed above the cradle support and removably attached thereto; and
    a plurality of legs extending downward from the cradle support, each of the legs having a distal end configured for removable attachment to a rescue aircraft.

2. The airborne recovery system according to claim 1, wherein:
    the plurality of temporary attachment fasteners extending upward from the cradle comprise pins; and
    the cradle further comprises a plurality of rollers extending partially above the upper surface of the cradle for adjustably supporting an aircraft with disabled landing gear thereon.

3. The airborne recovery system according to claim 1, wherein the cradle support has an upper surface and a plurality of rollers extending partially above the upper surface for adjustably supporting the cradle thereon, each of the legs extending downward from the cradle support being selectively telescoping.

4. The airborne recovery system according to claim 1, further comprising a pantograph extending from the cradle support between the legs thereof.

5. The airborne recovery system according to claim 1, further comprising a selectively telescoping forward cradle extension.

6. The airborne recovery system for aircraft with disabled landing gear according to claim 1, further comprising:
    laterally disposed first and second leading edge wing restraints adjustably extending from opposite sides of the cradle; and
    laterally disposed first and second trailing edge wing restraints adjustably extending from opposite sides of the cradle.

7. An airborne recovery system for aircraft with disabled landing gear, comprising:
    a cradle;
    a cradle support having a plurality of legs configured to attach to a rescue aircraft;
    a plurality of emergency landing wheels extending downward from the cradle; and
    a plurality of temporary fastener pins extending above the cradle, the temporary fastener pins being adapted for attaching the cradle to the aircraft with disabled landing gear.

8. The airborne recovery system according to claim 7, wherein said cradle has an upper surface and a plurality of rollers extending partially above the upper surface of the cradle for adjustably supporting an aircraft with disabled landing gear thereon.

9. The airborne recovery system according to claim 7, wherein said cradle further comprises a cradle extension selectively telescoping forward of said cradle.

10. The airborne recovery system according to claim 7, further comprising:
    laterally disposed first and second leading edge wing restraints adjustably extending from opposite sides of the cradle; and
    laterally disposed first and second trailing edge wing restraints adjustably extending from opposite sides of the cradle.

11. The airborne recovery system according to claim 7, wherein the cradle support has an upper surface and a plurality of rollers extending partially above the upper surface for adjustably supporting the cradle thereon, each of the legs extending from the cradle support being selectively telescoping.

12. The airborne recovery system according to claim 7, further comprising a pantograph extending from the cradle support between the legs thereof.

13. An airborne recovery system for aircraft with disabled landing gear, comprising:
    a cradle support having an upper surface;
    a plurality of rollers extending partially above the upper surface of the cradle support;
    a plurality of selectively telescoping legs extending downward from the cradle support, each of the legs having a distal end configured for removable attachment to a rescue aircraft;
    a cradle having landing gear, the cradle being releasably supported on the cradle support and attachable to an aircraft with disabled landing gear in flight.

14. The airborne recovery system according to claim 13, further comprising a pantograph extending downward from the cradle support between the legs thereof.

15. The airborne recovery system according to claim 13, wherein the landing gear of said cradle comprises a plurality of emergency landing wheels extending downward from said cradle, said cradle further comprising a plurality of temporary fastener pins extending above the cradle for attaching said cradle to the aircraft with disabled landing gear.

16. The airborne recovery system according to claim 15, further comprising a plurality of rollers extending partially above the upper surface of said cradle for adjustably supporting the aircraft with disabled landing gear.

17. The airborne recovery system according to claim 15, further comprising a cradle extension selectively telescoping forward of said cradle.

18. The airborne recovery system according to claim 15, further comprising:
    laterally disposed first and second leading edge wing restraints adjustably extending from opposite sides of the cradle; and
    laterally disposed first and second trailing edge wing restraints adjustably extending from opposite sides of the cradle.

* * * * *